(12) United States Patent
Sofos et al.

(10) Patent No.: US 8,161,506 B2
(45) Date of Patent: Apr. 17, 2012

(54) SYSTEM AND METHOD FOR MONITORING AND ALARMING IP-BASED VIDEO BLACKOUT EVENTS

(75) Inventors: James T. Sofos, Aurora, IL (US); Lee M. Chow, Naperville, IL (US); David Piepenbrink, Chicago, IL (US); Michael Reid, Villa Park, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 642 days.

(21) Appl. No.: 12/269,317

(22) Filed: Nov. 12, 2008

(65) Prior Publication Data
US 2010/0122280 A1    May 13, 2010

(51) Int. Cl.
*H04N 7/16* (2006.01)
(52) U.S. Cl. .......................................................... 725/25
(58) Field of Classification Search ...................... 725/25
See application file for complete search history.

(56) References Cited

U.S. PATENT DOCUMENTS

| 5,818,441 | A  | * | 10/1998 | Throckmorton et al. ...... 715/717 |
| 6,434,621 | B1 | * | 8/2002  | Pezzillo et al. ............... 709/231 |
| 2002/0150387 | A1 | * | 10/2002 | Kunii et al. ..................... 386/83 |
| 2007/0011702 | A1 |   | 1/2007  | Vaysman |
| 2007/0291944 | A1 | * | 12/2007 | Wingert et al. ............... 380/258 |
| 2008/0066095 | A1 |   | 3/2008  | Reinoso |
| 2008/0256569 | A1 |   | 10/2008 | Rhoades |

OTHER PUBLICATIONS

Lee Chow, System and Method of Restricting Access to Media Content, Nov. 1, 2007, 1033-070127, (32 pages).

* cited by examiner

*Primary Examiner* — Dominic D Saltarelli
(74) *Attorney, Agent, or Firm* — Toler Law Group, PC

(57) ABSTRACT

Systems and methods for selecting a video transmission event to be blacked out and storing a data record with instructions to color code an element within a graphical user interface based on the blackout are disclosed.

16 Claims, 9 Drawing Sheets

| Events | Restrictions | Approx. Start/End |
|---|---|---|
| Dodgers @ Mets | Blackout in NY | 05-01-2006--17:00/19:00 |
| Padres @ Cubs | Blackout in CA | 05-01-2006--17:00/19:00 |
| St. Bonaventure @ St. Josephs | Blackout FOXNE, FOXOH, FOXP, FSNY, FXCN | 05-01-2006--17:00/19:00 |
| | | |
| GA Tech @ Duke | Blackout FXCN | 05-01-2006--20:00/23:00 |
| Washington St. @ Arizona | Blackout in NY | 05-01-2006--20:00/23:00 |
| Rays @ Jays | Blackout in CA | 05-01-2006--20:00/23:00 |
| | | |

[Create Horizontal Link] [Add Event] [Modify Start/End]
[Create Vertical Link] [Modify Restrictions]

SYSTEM AND METHOD FOR MONITORING AND ALARMING IP-BASED VIDEO BLACKOUT EVENTS

FIELD OF THE DISCLOSURE

The present disclosure is generally related to systems and methods for monitoring IP-based video blackout events and generating alarms.

BACKGROUND

Television content providers may purchase rights to show certain programming within particular geographic areas. For example, a first television content provider may purchase rights to show a sporting event within a first geographic area (e.g., a city) and a second television content provider may have rights to show the sporting event in a second geographic area (nationally, except for the city). If the second content provider normally provides programming within the first geographic area, the second content provider may be required to blackout the sporting event within the second geographic area. On particular days, there may be several sporting events or other programs that a single content provider must blackout in different geographic areas. Hence, there is a need for an improved system and method of monitoring video transmissions and generating alarms to alert users of changes in the states of video transmissions.

DETAILED DESCRIPTION

In a particular embodiment, a method includes selecting a video transmission event associated with content to be blacked out based on a geographic access restriction and storing a data record including instructions to color code an element within a graphical user interface based on whether the video transmission event is blacked out.

In another particular embodiment, a method includes receiving a selection from a user relating to a type of alarm and at least one criterion under which the alarm is to be generated for a video transmission and an associated blackout event. The method further includes monitoring the video transmission and generating an alarm when the at least one criterion is satisfied.

In another particular embodiment, a system includes a user interface and a control system operatively coupled to the user interface. The control system is adapted to present a graphical user interface via the user interface to select a video transmission event associated with content to be blacked out based on a geographic access restriction and color code video transmission events to be blacked out within the graphical user interface.

In another particular embodiment a method includes accessing a schedule comprising a plurality of blackout records. Each of the blackout records specifies content to be blacked out at a particular geographic location. The method further includes determining whether to generate a blackout alert related to at least one blackout record of the plurality of blackout records and presenting a graphical user interface at a display device. The graphical user interface includes color-coded information related to the at least one blackout record, and a color of the color-coded information indicates a type of the blackout alert associated with the at least one blackout record.

In another particular embodiment, a method includes accessing a schedule comprising at least one blackout record specifying content to be blacked out at a particular geographic location at a particular time and presenting a graphical user interface at a display device. The graphical user interface includes color-coded information related to the at least one blackout record.

Figure 1:
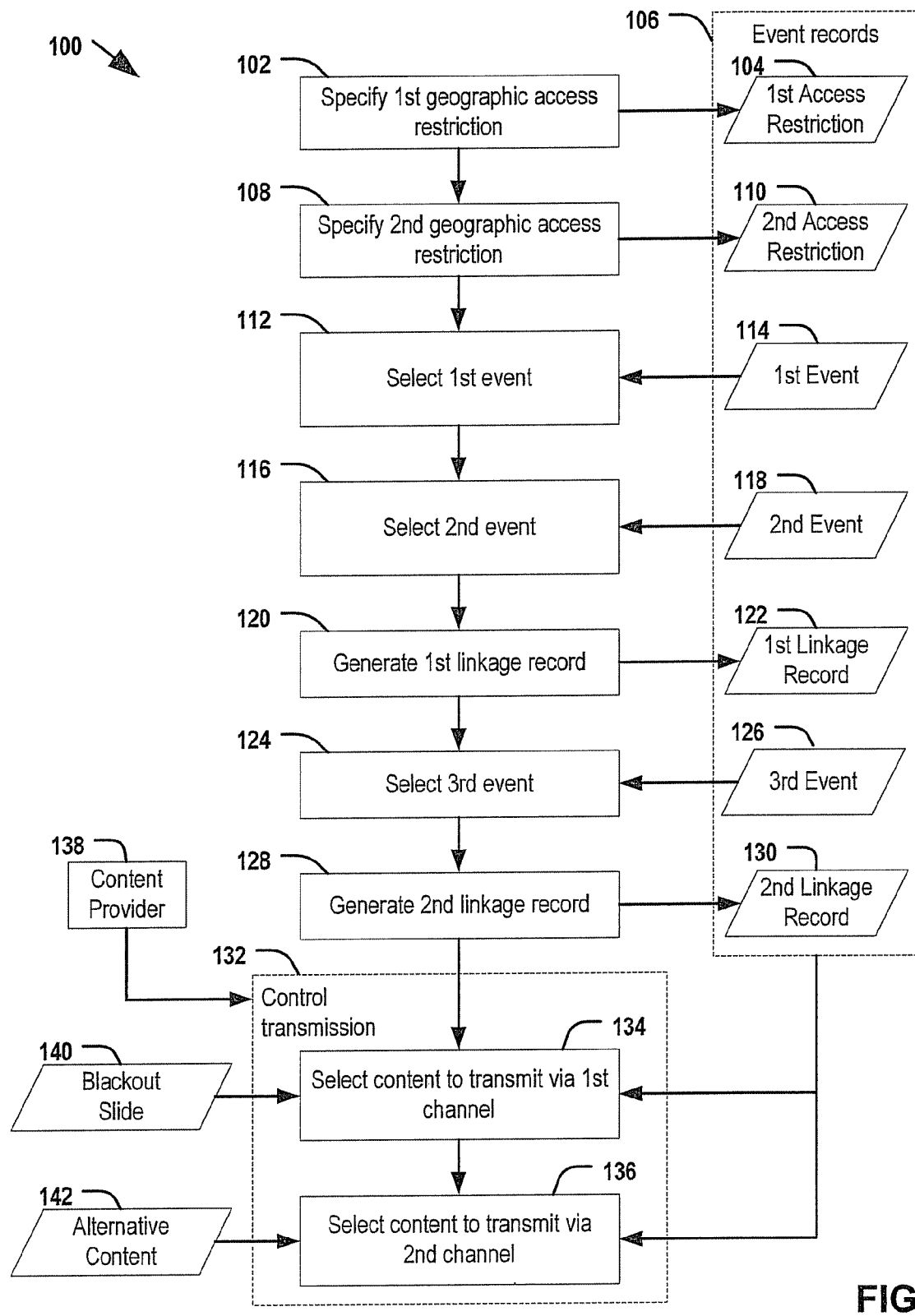
FIG. 1 is flow diagram of a particular embodiment of a system for scheduling video transmissions.

FIG. 1 depicts a particular embodiment of a method of video transmission scheduling, generally designated 100. The method 100 includes, at 102, specifying a first geographic access restriction associated with a first video transmission event as a first access restriction record 104. The method 100 also includes, at 108, specifying a second geographic access restriction associated with a second video transmission event as a second access restriction record 110. In a particular embodiment, the first geographic access restriction record 104 may indicate one or more geographic areas where content associated with a first video transmission event 114 is not to be made available. For example, the content associated with first video transmission event 114 may be subject to a blackout within the one or more geographic areas as identified in the first geographic access restriction record 104. In a particular embodiment, the second access restriction record 110 may indicate that content associated with a second video transmission event 118 is not to be available in one or more geographic areas. For example, the content associated with the second video transmission event 118 may be subject to a blackout within the one or more geographic areas as identified in the second geographic access restriction record 110.

In a particular illustrative embodiment, the first video transmission event 114 or the second video transmission event 118 may include video content associated with at least one sporting event. For example, the first video transmission event 114 may include a first sporting event subject to blackout within particular geographic areas, and the second video transmission event 118 may include a second sporting event subject to blackout within particular geographic areas. In a particular embodiment, the first video transmission event 114 may be associated with a particular content provider, for example a television network, and the second video transmission event 118 may be associated with the same content provider or with a different provider.

The method 100 may also include, at 112, selecting the first video transmission event 114. The method 100 may also include, at 116, selecting the second video transmission event 118. In an illustrative embodiment, the first video transmission event 114 may be associated with video content to be blacked out based on the first geographic access restriction and the second video transmission event 118 may be associated with second video content to be blacked out based on the second geographic access restriction.

In a particular embodiment, the method 100 may also include, at 120, generating a first linkage record 122. The first linkage record 122 may specify a link between the first video transmission event 114 and the second video transmission event 118. The link may indicate to a video transmission control system that when a trigger associated with the first video transmission event 114 is received, an action relative to the second video transmission event 118 should be executed. For example, when an operator sends a trigger indicating an end of a blackout related to the first video transmission event 114, the video transmission control system may automatically end a blackout related to the second video transmission event 118 linked to the first video transmission event 114. In another example, when an operator sends a trigger indicating an end of a blackout related to the first video transmission event 114, the video transmission control system may automatically start a blackout related to the second video transmission event 118 linked to the first video transmission event 114. In a particular illustrative embodiment, the operator may send the trigger associated with the first video transmission event based on observing video content associated with the first video transmission event. For example, the operator may observe a live sporting event associated with the first video transmission event and may send a trigger to the video transmission control system when the live sporting event ends.

In an illustrative embodiment, the first video transmission event 114 and the second video transmission event 118 may be linked beginning-to-beginning. In another illustrative embodiment, the first video transmission event 114 and the second video transmission event 118 may be linked ending-to-ending. When the first video transmission event 114 and the second video transmission event 118 are linked beginning-to-beginning or ending-to-ending, the link may be referred to as a vertical link. A vertical link may be useful, for example, when the same video content is to be blacked out on a first channel and a second channel at the same time. To illustrate, where a sporting event is to be blacked out on a first channel associated with a first geographic area and is to be simultaneously blacked out on a second channel associated with the second geographic area, the first linkage record 122 may link the beginning of the blackout period on the first channel and the second channel so that the blackout events begin simultaneously. Similarly, the first linkage record 122 may associate the ending of the blackout period on the first channel and on the second channel so that the blackout events end simultaneously. Additionally, while the first and second transmission events 114, 118 are vertically linked, an operator may observe the content of one of the events, for example, the content associated with the first video transmission event 114, and may send a trigger indicating the end of the content to end the blackout of both the first video transmission event 114 and the second video transmission event 118. That is, continuing the illustration above, when the sporting event is over, the blackout of the sporting event on both channels may be ended simultaneously by the operator sending one trigger indicating the end of the sporting event.

In another illustrative embodiment, the first video transmission event 114 and the second video transmission event 118 may be linked ending-to-beginning. When the first video transmission event 114 and the second video transmission event 118 are linked ending-to-beginning, the link may be referred to as a horizontal link. A horizontal link may be useful, for example, when a first sporting event includes geographic access restrictions on a first channel, and a second, subsequent sporting event includes geographic access restrictions on the same channel. To illustrate, when a live sporting event is to be followed by a second live sporting event on the same channel, the linkage record 122 may specify a horizontal link between the live sporting events. Thus, an operator may observe an ending of the first sporting event, and, send a trigger indicating the end of the first sporting event to end a blackout of the first sporting event, and to automatically begin of the blackout associated with the second event.

The method 100 may also include, at 124, selecting a third video transmission event 126, and, at 128, generating a second linkage record 130. The second linkage record 130 may specify a link between the third video transmission event 126 and at least one of the first video transmission event 114 and the second video transmission event 118. To illustrate, the first video transmission event 114 and second video transmission event 118 may be linked vertically, as previously described. The third video transmission event 126 may be linked horizontally to the first or the second video transmission event 114, 118. For example, the third video transmission event 126 may occur on the same channel and subsequent to the second video transmission event 118, and the third video transmission event 126 may be horizontally linked to the second video transmission event 118. That is, the end of the second video transmission event 118 may be linked to the beginning of the third video transmission event 126. When two or more video transmission events are linked vertically and one or more video transmission events are linked horizontally to one of the vertically linked events, the arrangement may be referred to as compound linking.

In a particular embodiment, the method 100 may include, at 132, controlling transmission of video content. In an illustrative embodiment, controlling transmission of video content may include receiving content from a content provider 138, and, at 134, selecting content to transmit via a first channel based on the first video transmission event 114, the first geographic access restrictions 104 and the first linkage record 122. Controlling transmission of video content may also include, at 136, selecting content to transmit via a second channel based on the second video transmission event 118, the second geographic access restriction 110 and the first linkage record 122. In a particular illustrative embodiment, content provided by the content provider 138 for display via a first channel may be blacked out in particular geographic areas based on the first access restrictions record 104. The first access restrictions record 104 may specify the substitute content to be transmitted via the first channel as a result of the blackout. For example, the substitute content may include a blackout slide 140 to indicate to viewers that particular content is blacked out in their geographic area. In another example, the first access restrictions record 104 may identify alternative content 142 to transmit via the first channel to the particular geographic areas where the first video transmission event 114 is blacked out. The alternative content 142 may include, for example, an alternative sporting event, such as a previously recorded sporting event or another sporting event which the content provider has rights to transmit and which is not restricted from the geographic area in question. In a particular illustrative embodiment, controlling transmission of video content may include accessing event records 106, such as the first access restrictions record 104, the second access restrictions record 110, the first video transmission event 114, the second video transmission event 118, the first linkage record 122, other event records 106, or any combination thereof, to determine content to be transmitted via at least one channel.

Figure 2:
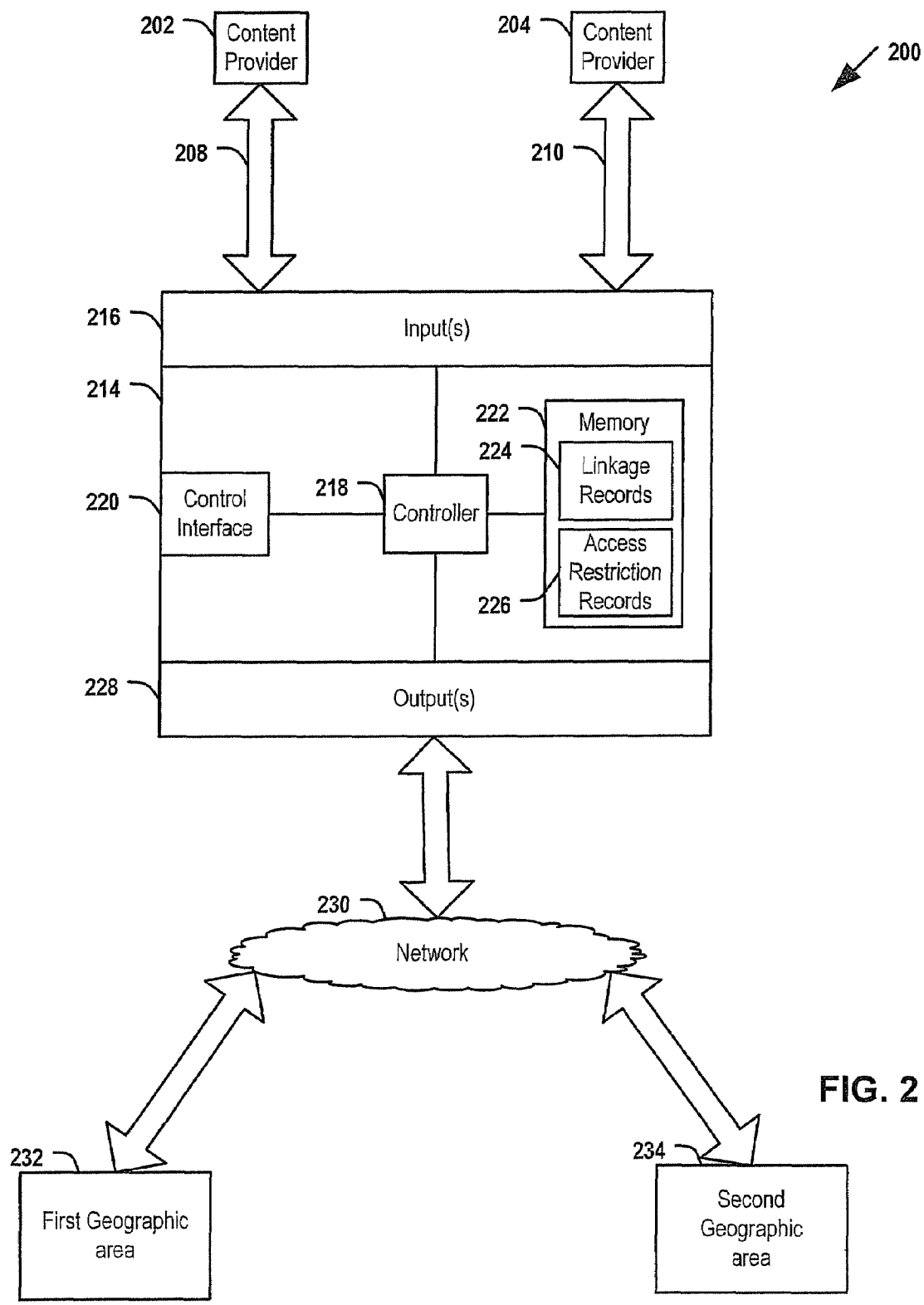
FIG. 2 is a block diagram of a particular embodiment of a system for scheduling video transmissions.

FIG. 2 depicts a particular embodiment of a system to schedule video transmissions, generally designated 200. The system 200 includes a video transmission system 214 receiving video content from a first content provider 202 via a first video feed 208 and from a second content provider 204 via a second video feed 210. The video transmission system 214 selects video content to provide via a plurality of channels to particular geographic areas, such as first geographic area 232 and second geographic area 234. In a particular illustrative embodiment, each channel may be available in each geographic area. For example, the video transmission system 214 may include an Internet Protocol Television (IPTV) national hub office, which provides video content to subscribers nationwide via an IPTV system. In a particular embodiment, the IPTV national hub office may provide video content via multicast. Each IPTV channel may be associated with a particular multicast group. In a particular illustrative embodiment, users or subscribers in each geographic area 232, 234 may be able to access each multicast group, and thus, each channel. However, in particular circumstances certain video content may be associated with geographic access restrictions. For example, the rights to transmit certain live sporting events in a particular geographic area, such as the first geographic area 232, may be purchased by a particular content provider, such as the first content provider 202. A second particular content provider, such as the second content provider 204, may also have rights to broadcast the sporting event in other geographic areas, such as the second geographic area 234. In a particular embodiment, the video transmission system 214 may enable enforcement of the geographic access restrictions by blacking out the restricted access content in the particular geographic areas in which restrictions apply.

In a particular embodiment, the video transmission system 214 may have one or more inputs 216 to receive one or more video feeds 208, 210. The video transmission system 214 may also include one or more outputs 228 to send video content to the first geographic area 232 and the second geographic area 234. In a particular embodiment, the video transmission system 214 may send the video content via a network 230, such as an access network of an IPTV system.

In a particular embodiment, the video transmission system 214 may include a controller 218. The controller 218 may select video content to provide via each channel to each geographic area. In a particular embodiment, the video transmission system 214 may also include a control interface 220. The control interface 220 may receive linking information specifying a relationship between a first end point of a first video transmission event and a second end point of a second video transmission event. In a particular embodiment, the linking information may be stored in a memory 222 as a linkage record 224. The memory 222 may also include an access restriction records 226 specifying geographic access restrictions associated with the first video transmission event and the second video transmission event.

In a particular embodiment, the linkage records 224 may specify a vertical link between the first video transmission event and the second video transmission event. To illustrate, the first video transmission event and second video transmission event may be associated with the same video content presented via different channels at the same time. The vertical link between the first video transmission event and the second video transmission event may indicate that a blackout event associated with the first video transmission event and second video transmission event is to begin and/or end substantially simultaneously on the two channels.

In a particular embodiment, the linkage records 224 may specify a horizontal link between the first video transmission event and the second video transmission event. For example, the first video transmission event and second video transmission event may include content to be presented via the same channel in series, that is, the first video transmission event followed by the second video transmission event. Thus, the linkage record 224 may indicate that an end point of the first video transmission event should initiate the second video transmission event. To illustrate, a blackout of content associated with the second video transmission event should begin when the ending of the content associated with the first video transmission event is indicated.

In a particular embodiment, a control interface 220 may be adapted to receive an indication of the occurrence of an end point associated with a video transmission event. For example, the control interface 220 may receive input from an operator based on the operator's observation of the content associated with the first video transmission event. That is, the operator may observe the video content associated with the first video transmission event and may manually input when an end point of the content associated with the video transmission event has occurred. In a particular embodiment, estimated end points associated with video transmission events may also be stored in the memory 222. In this embodiment, occurrence of an end point of a video transmission event may be indicated by the occurrence of the estimated end point time unless otherwise indicated by an operator via the control interface 220. For example, when it is clear that the end point of the video content associated with the first video transmission event will occur after the estimated end point, the operator at the control interface 220 may modify the estimated end point to indicate the new estimated end time. To illustrate, when a live sporting event goes into overtime, it may be apparent to the operator that the sporting event will not end at the expected time. The operator may enter a new estimated end time via the control interface 220.

In a particular embodiment, the control interface 220 may be adapted to receive input removing a link between two video transmission events. For example, when an end point of a first video transmission event occurs earlier than the expected end point time, a previously specified link between the first video transmission event and the second video transmission event may be removed. This may ensure that a blackout of the second video transmission event does not begin as a result of ending a blackout associated with the first video transmission event.

Figures 3, 4:
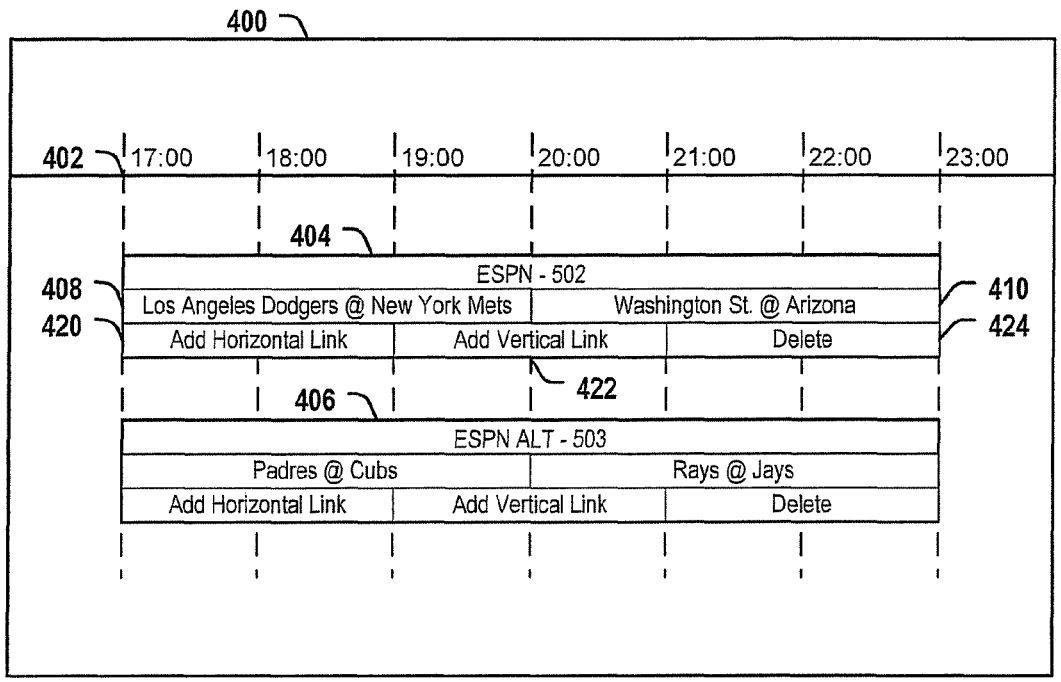
FIG. 3 is an illustration of a first particular embodiment of a user interface display to schedule video transmissions.
FIG. 4 is an illustration of a second particular embodiment of a user interface display to schedule video transmissions.

FIG. 3 depicts a first particular embodiment of a user interface display to schedule video transmissions, generally designated 300. In a particular embodiment, the user interface display 300 may be presented by a video transmission system via a control interface, such as the control interface 220 discussed with reference to FIG. 2. The user interface display 300 includes a plurality of video transmission events 302. Each video transmission event of the plurality of video transmission events 302 is associated with one or more geographic access restrictions 304. The video transmission events 302 may also be associated with approximate start and end times 306. For example, a first video transmission event 310 indicates that a sporting event will occur between the Dodgers and the Mets. The user interface display 300 also indicates that the Dodgers and Mets sporting event should be blacked out in New York, and that the sporting event is expected to last from approximately 17:00 to 19:00 on May 1, 2006.

The user interface display 300 also includes a plurality of user selectable graphics. For example, the user interface display 300 may include a graphic 320 indicating a user selectable option to create a horizontal link between two or more selected video transmission events. In an illustrative embodiment, a horizontal link may be specified when a first video event and the second video event are to be blacked out on the same channel, one following the other. The user interface display 300 may also include a graphic 322 indicating a user selectable option to create a vertical link. In an illustrative embodiment, a vertical link may occur when a particular event is to be blacked out on more than one channel at the same time. In a particular embodiment, the user interface display 300 may also include a graphic 324 indicating a user selectable option to add an event to the plurality of video transmission events 302. In a particular embodiment, the user interface display 300 may also include a graphic 326 indicating a user selectable option to modify restrictions associated with a selected event. The user interface display 300 may also include a graphic 328 indicating a user selectable option to modify an estimated start time or end time associated with an event.

FIG. 4 depicts a second particular embodiment of a user interface display for scheduling video transmissions, generally designated 400. The user interface display 400 includes a time line 402 horizontally. The time line 402 provides a graphic representation of the passage of time, allowing an operator to see the temporal relationship between video transmission events. The user interface display 400 may also include a listing of channels vertically, and an identification of video transmission events associated with particular channels. For example, the user interface display 400 includes a first channel 404 identified as "ESPN-502" and a second channel 406 identified as "ESPN ALT-503." The user interface display 400 may identify links associated with video transmission events based on linkage records. For example, the user interface display 400 includes a first video transmission event 408 identified as "Los Angles Dodgers@New York Mets" and a second video transmission event 410 identified as "Washington St.@Arizona." Thus, the user interface display 400 indicates to an operator or user that the first video transmission event 408 and the second video transmission event 410 are horizontally linked. That is, that the first video transmission event 408 is to be blacked out on channel ESPN-502, and that upon the ending of the first video transmission event, the second video transmission event 410 is to be blacked out on channel ESPN-502. That is, when the operator indicates that the Dodge@Mets sporting event has ended, the blackout of the Washington St.@Arizona sporting event should begin.

In a particular embodiment, the user interface display 400 may include input control features for modifying or adding to the linkage records. For example, the user interface display 400 may include a graphic 420 indicating a user selectable option to add a horizontal link. Thus, via selection of graphic 420, the user may indicate that an additional video transmission event should be horizontally linked before the first video transmission event 408 or after the second video transmission event 410. The user interface display 400 may also include a graphic 422 indicating the user selectable option to add a vertical link. Thus, via selection of graphic 422, the user may indicate that the first video transmission event 408 or the second video transmission event 410 should be simultaneously blacked out on another channel, for example, on ESPN ALT 406.

Figure 5:
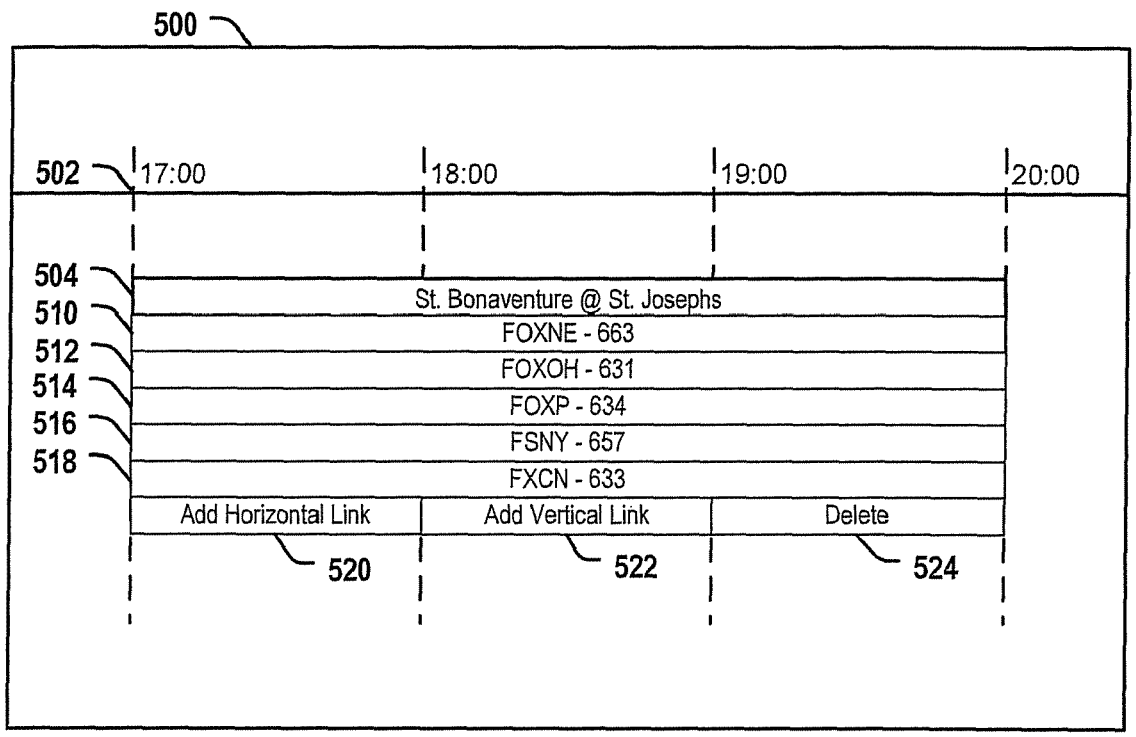
FIG. 5 is an illustration of a third particular embodiment of a user interface display to schedule video transmissions.

FIG. 5 depicts a third particular embodiment of a user interface display for scheduling video transmissions, generally designated 500. The user interface display 500 includes a time line 502 horizontally. The time line 502 provides a graphic representation of the passage of time, allowing an operator to see the temporal relationship between video transmission events. The user interface display 500 may also include a listing of channels vertically, and an identification of video content associated with the channels. For example, the user interface display 500 includes video content 504 identified as "St. Bonaventure@St. Joseph." The user interface display 500 also includes a plurality of channels on which the video content 504 is to be blacked out. Thus, the user interface display 500 identifies a plurality of vertical links associated with the video content 504. That is, the video transmission event 510 is associated with the video content 504 on channel "663;" the video transmission event 512 is associated with the video content 504 on channel "631;" the video transmission event 514 is associated with the video content 504 on channel "634;" the video transmission event 516 is associated with the video content 504 on channel "657;" and the video transmission event 518 is associated with the video content 504 on channel "633."Hence, the video transmission events 510, 512, 514, 516 and 518 are linked vertically.

In a particular embodiment, the user interface display 500 may also include input control features. For example, the user interface display 500 may include a graphic 520 indicating a user selectable option to add a horizontal link. Selecting add horizontal link option 520 may allow a user to link another video transmission event to link horizontally to one or more of the video transmission events 510-518. The user interface display 500 may also include a graphic 522 indicating a user selectable option to add a vertical link. Selecting add a vertical link option 522 may allow a user to add another video transmission event to the list of video transmission events vertically linked in the user interface display 500. The user interface display 500 may also include a graphic 524 indicating a user selectable option to delete one or more of the links associating the video transmission events 510-518.

Figure 6:
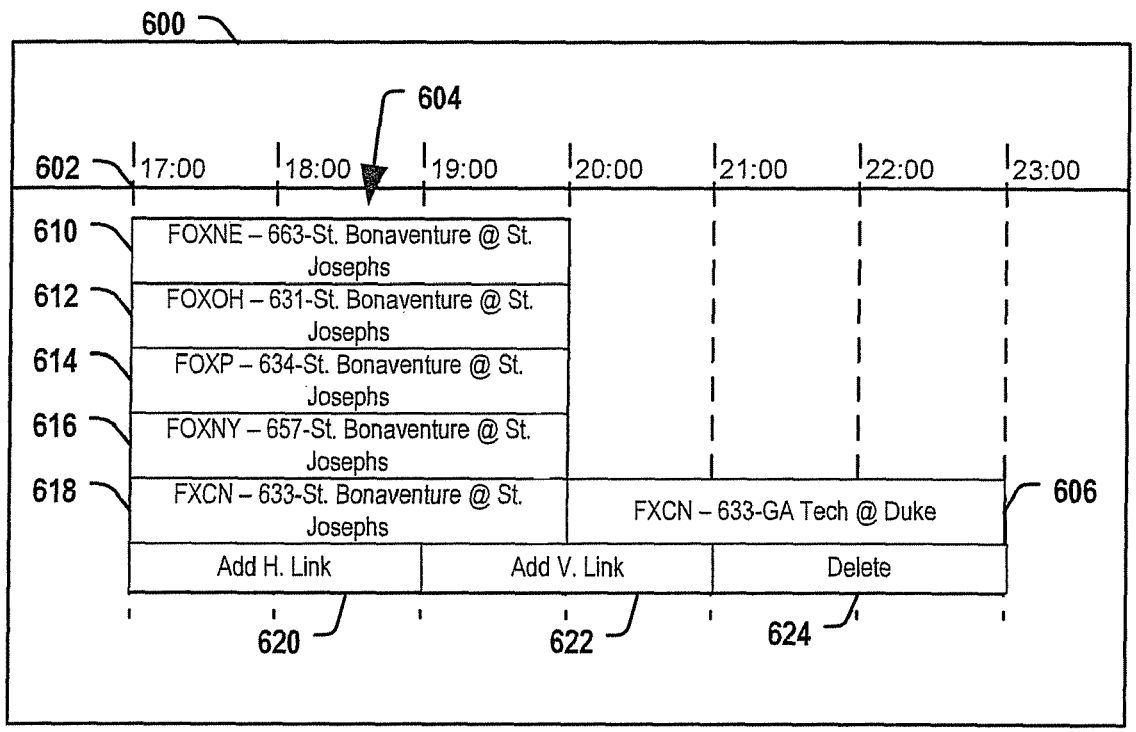
FIG. 6 is an illustration of a fourth particular embodiment of a user interface display to schedule video transmissions.

FIG. 6 depicts a fourth particular embodiment of a user interface display for scheduling video transmissions, generally designated 600. The user interface display depicted in FIG. 6 illustrates compound linking of video transmission events. The user interface display 600 includes a time line 602 graphically illustrating the temporal relationship between video transmission events. The user interface display 600 also includes a plurality of video transmission events linked vertically 604. For example, the user interface display 600 includes a first video transmission event 610 identified as "St. Bonaventure@St. Josephs" on a channel "FOXNE-663;" a second video transmission event 612 identified as "St. Bonaventure@St. Josephs" on a channel "FOXOH-631;" a third video transmission event 614 identified as "St. Bonaventure@St. Josephs" on a channel "FOXP-634;" a fourth video transmission event 616 identified as "St. Bonaventure@St. Josephs" on a channel "FOXNY-657;" and a fifth video transmission event 618 identified as "St. Bonaventure@St. Josephs" on a channel "FXCN-633." The user interface display also includes at least one video transmission event 606 horizontally linked to at least one of the vertically linked video transmission events 618. The horizontally linked video transmission event 606 is identified as "Georgia Tech@Duke" on channel "FXCN-633" after the "St. Bonaventure@St. Josephs" event. Thus, the user interface display 600 indicates that the "St. Bonaventure@St. Josephs" sporting event should be blacked out on channels 663, 631, 634, 657 and 633 simultaneously, and, at the ending of the "St. Bonaventure@St. Josephs" sporting event the "Georgia Tech@Duke" sporting event should be blacked out at channel 633.

In a particular embodiment, the vertically linked video transmission events 604 may be controlled substantially simultaneously. That is, an operator may indicate the occurrence of the end of one of these sporting events to trigger an end to the blackout of each of these events on each of these channels. Additionally, the user interface display 600 indicates that when the blackout of the "St. Bonaventure@St. Josephs" event ends, a blackout of the "Georgia Tech@Duke" event should begin.

In a particular embodiment, the user interface display 600 may include a plurality of input control features. For example, the user interface display 600 may include a graphic 620 indicating a user selectable option to add a horizontal link. The user interface display 600 may also include a graphic 622 indicating a user selectable option to add a vertical link. The user interface display 600 may also include a graphic 624 indicating a user selectable option to delete at least one link.

Figure 7:
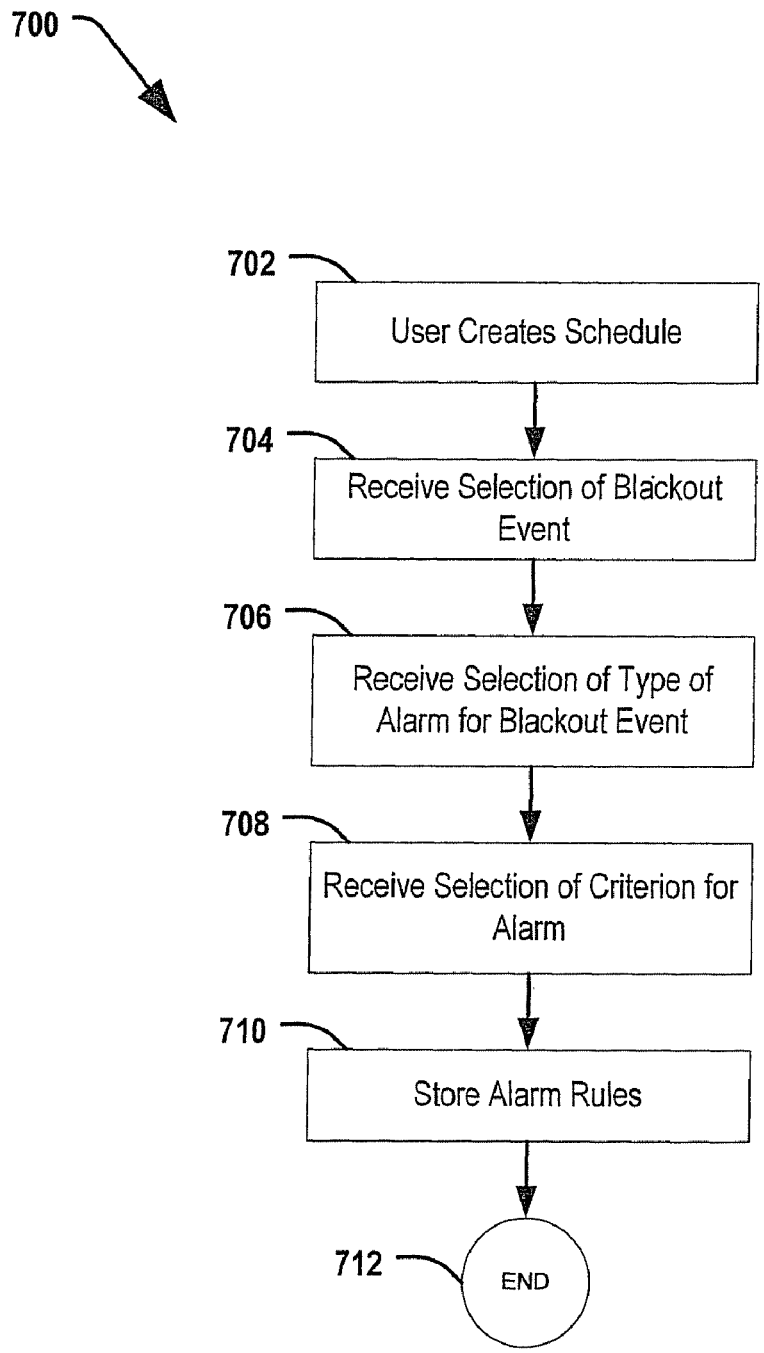
FIG. 7 is a flow chart illustrating an exemplary method of creating rules for monitoring and alarming video transmissions and blackouts.

Referring to FIG. 7, a particular embodiment of a method of setting alarms for a video transmission schedule is illustrated and is generally designated 700. At 702, the user creates a schedule that includes at least one blackout event. The user may create the schedule using one of the previously described interfaces and methods, or by using the interface of FIG. 9, described below. Having received the schedule and at least one corresponding blackout event, a control system (e.g., controller 218 described with respect to FIG. 2) receives a selection of a blackout event within the schedule from the user, at 704. At 706, the control system receives a selection of a type of alarm for the selected blackout event. The type of alarm includes audible alarms and visual alarms. Furthermore, the type of alarm may include a particular tone (e.g., klaxon bell, beep, chirp, fog horn, or the like) or the particular appearance of a visual alarm (e.g., color changes, a pop up window appears with textual alert, or the like). While not illustrated, the selection could be made through a drop down menu accessible through a mouse click (e.g., a right mouse click) or by use of another user interface selection mechanism.

The control system receives a selection of at least one criterion under which the alarm is generated, at 708. Various criteria particularly contemplated as forming the basis of an alarm include, but are not limited to: a threshold of time remaining until the video transmission (and the associated blackout event) starts (e.g., a ten minute warning, a five minute warning, a two minute warning, a one minute warning, and a thirty second warning), a time for the video transmission (and the associated blackout event) to start, whether the blackout event started as scheduled, whether the video transmission (and its associated blackout event) is in progress, a threshold of time remaining until the video transmission (and the associated blackout event) ends, whether the blackout event ended as scheduled, whether the blackout event has been extended (e.g., a sporting event went into overtime), whether the video transmission (and the associated blackout event) has concluded, or the like. It should be readily appreciated that the order of the selection of the alarm and the criterion can be reversed without departing from the scope of the present disclosure. The method of entry of the criterion may vary depending on the user interface used. The control system then stores alarm rules (i.e, rules relating to the type and criterion associated with the alarm) at 710, and the process ends at 712. The alarm rules may be stored in the memory 222 as described in reference to FIG. 2. While not specifically addressed, a single alarm may have multiple criteria which must be satisfied for the alarm to be generated. The user may select a desired number of criteria and may select thresholds of particular criteria during alarm rule creation.

Figure 8:
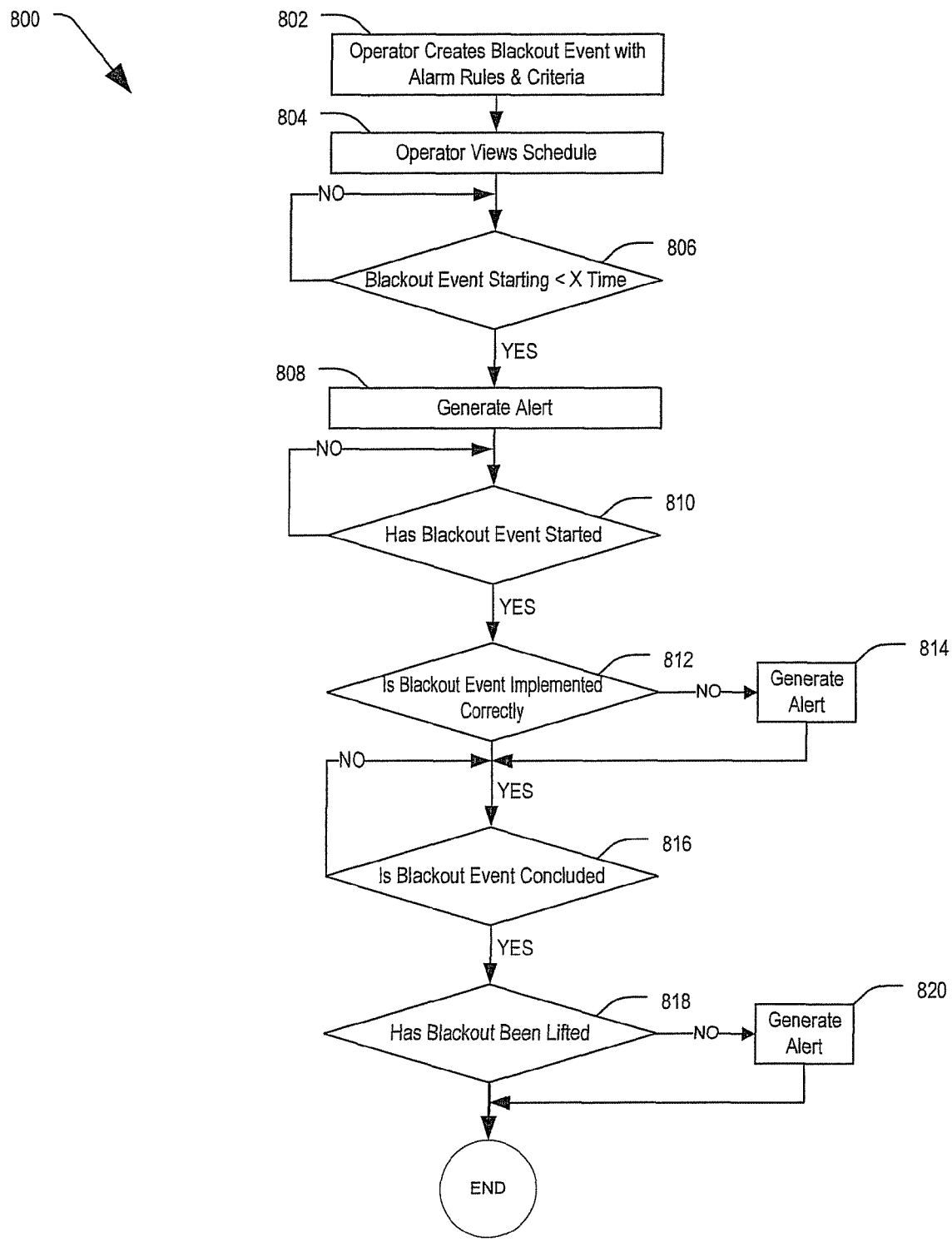
FIG. 8 is a flow chart illustrating an exemplary method of monitoring and alarming video transmissions and blackouts.

FIG. 8 illustrates an exemplary embodiment of a method of monitoring video transmissions and blackout events, generally designated 800. An operator creates a blackout event through a graphical user interface and creates alarm rules and criteria associated with the blackout event (such as the method of alarming a transmission schedule previously described in method 700 and using any appropriate graphical user interface) at 802. For example, it is assumed that, at 802, the operator has chosen to receive an alert at a predetermined time before a particular blackout event is scheduled to start, an alarm if the blackout event does not start correctly, and an alarm when the blackout event has ended correctly. Other embodiments allow for different alerts and alarms as dictated by operator selection. For the purposes of the present disclosure, an alert and an alarm operate similarly (i.e., have the same mechanisms by which an operator may select a criterion and a type). However, the use of an alarm connotes a situation of some severity in which the user or operator should or may take an affirmative action. In contrast, the use of an alert connotes a situation of less relative severity in which the user or operator is apprised of a state change but does not necessarily have to take an affirmative action.

In a particular embodiment, once the transmission schedule is alarmed, the transmission schedule may include visual alerts in the form of color coded entries. At 804, as time progresses, the operator may view the schedule and more particularly may view the color coded entries within the schedule to check the status of transmission events and associated blackout events. However, given that the present example assumes only a single blackout event, the operator would view only the single blackout event.

At 806, the control system determines when the blackout event is about to start. When the control system determines that the blackout event is about to start, an alert is generated at 808. When the control system determines that the blackout event is not about to start, the method 800 continues to monitor the time remaining until the blackout event is about to start. An exemplary technique through which the control system can determine when the blackout event is about to start is by comparing a system clock time to a scheduled blackout event start time. When the time between the current system clock time and the schedule blackout event start time is below a threshold as set by the operator, the control system determines that the blackout event is about to start. In an alternate embodiment, various thresholds for a single event may be used, each with its own alert and/or alarm. For example, a ten minute warning may cause a color shift from green to yellow in the display of the schedule and a two minute warning may generate an audible alert. Other color shifts, audible events or the like may also be used if desired by the operator. However, if many blackout events occur contemporaneously, such myriad alarms may distract the operator. The individual operators may determine what level of alarming works best for their individual tastes. Alternatively, company policy may dictate what alerts and alarms are used so that the system is implemented consistently across all shifts.

Once the alert is generated, at 808, the control system monitors for whether the blackout event has started, at 810. This decision may be made by comparing the system clock to the scheduled blackout event start time. If the control system determines that the blackout event has not started, the method 800 continues to monitor the time until the control system determines that the blackout event has started. Once the control system determines that the blackout event has started, the control system determines whether the blackout event has been implemented correctly, at 812. This determination may be made based on a report from one or more set top boxes or other network elements deployed within a restricted geographical region, through customer reports, direct observation, or the like. When the control system determines that the blackout event has not been implemented correctly, an alarm is generated, at 814. In response to the generated alarm, appropriate corrective measures may then be undertaken by the operator.

After alarm generation (or if the blackout event has been implemented correctly) the control system continues to monitor the video transmission and its associated blackout event to determine if the blackout event has concluded as scheduled, at 816. If the control system determines that the blackout event has not concluded, the method 800 continues to monitor until the control system determines that the blackout event has concluded. When the control system determines that the blackout event has concluded, the control system determines if the blackout has been lifted, at 818. Again, the control system may make this determination based on input from set top boxes, customer complaints, direct observation, or the like. One exemplary automated method of determining if the blackout has been lifted involves polling a set top box for a copy of a current control message to see if the blackout is still listed, querying the set top box or other network element for a list of digital rights management (DRM) keys, or the like. If the blackout event should have ended based on the blackout event end time, but has not been detected as lifted, an alarm is generated at 820. The operator may then take corrective measures as appropriate including redistributing a control message with the blackout lifted, distributing new DRM keys, or the like. The method then ends.

It should be appreciated that other alarms and alerts could have been designated by the user or operator and would fit within the method 800 at the appropriate temporal time. Likewise, the method 800 may be modified while it is in progress. For example, if a blackout event is extended, such as when a sporting event goes into overtime, the alerts and alarms may be modified to accommodate the extension.

It should be appreciated that implementing one or more embodiments of monitoring and alarming video transmission schedules allows operators to have a concise, color coded visual display that quickly tells the operator which blackout events are occurring and where problems may be occurring. Likewise, the automated verification of blackout starts and finishes allows alarms to be generated quickly so that appropriate corrective measures may be taken, thereby facilitating compliance with contractual obligations.

Figure 9:
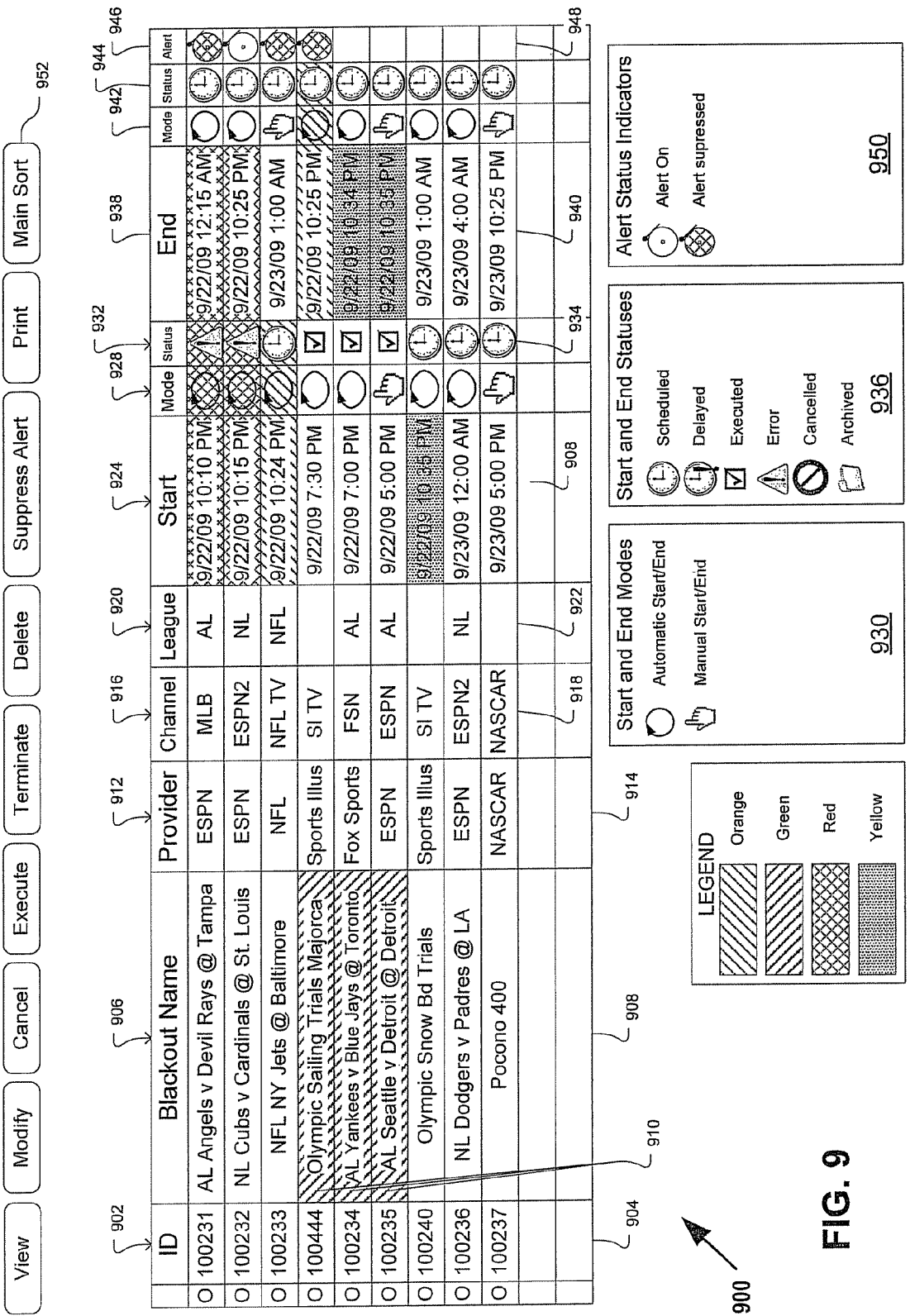
FIG. 9 is an illustration of a fifth particular embodiment of a user interface display to monitor and alarm video transmissions and blackouts.

An exemplary screen shot showing an illustrative graphical user interface (GUI) 900 is illustrated in FIG. 9. As illustrated, the GUI 900 presents a blackout schedule that lists transmission events that have associated blackout events. The entries that are used to populate the GUI 900 may be stored in a database (not shown), such as in the memory 222. While the GUI 900 duplicates much of the information that might be used in the database, some information need not be presented, and the GUI 900 should not be construed as being an exhaustive representation of the information in such a database or as the only way to present such information. While the GUI 900 may include an identification (ID) field 902 where unique identification codes 904 are listed so that the records in the database may be tracked or sorted, such information need not be presented to the user or operator.

The GUI 900 may include a blackout event field 906 with blackout events 908 listed therein. The entries 910 are shaded to represent that they are color coded green to reflect an alert previously selected by the user. In this example, the alert indicate blackout entries that are currently in progress (assuming a date and time of Sep. 22, 2009 at 10:20 PM).

The GUI 900 may further include a provider field 912 in which content providers 914 for particular transmission events are listed. Additionally, a channel field 916 may list channels 918 on which a particular monitored transmission event is to occur. Still further, a league field 920 may list any league affiliations 922 that may implicate other contractual requirements such as logo watermarks that should be displayed with the transmission event or the like.

The GUI 900 may further include a start time field 924 that lists the start times for any blackout events. Because it is 10:20 PM in this example, blackout events that should have already started are color coded red, blackout events that start within five minutes are color coded orange, and blackout events that start within fifteen minutes are color-coded yellow. A mode field 928 may list whether a particular blackout event is to be activated manually or automatically. Note that clicking on an icon within the mode field 928 may create a pop-up menu 930 that allows the user to select or change the mode.

The GUI 900 may further include a status field 932 that lists current statuses 934 of the blackout event. Inset 936 lists some exemplary status icons that have been particularly contemplated, such as: scheduled, delayed, executed, errored, canceled, and archived. Note that the statuses 934 and the modes may also be color coded to facilitate an understanding of why a particular event is colored the way it appears. As illustrated, the two baseball games that should have already started are errored and colored red.

The GUI 900 may further include an end time field 938 that lists end times 940 for each blackout event. Again, end times may be color coded so that the user may ascertain with a quick visual inspection which blackout events should have state changes in the near future, and through the colors used, how soon a particular state change is to occur (e.g., events within five minutes are orange; those within fifteen minutes are yellow). The end time may include a mode field 942 and a status field 944 that operate for the end time similarly to the fields 928 and 932 for the start time.

The GUI 900 may further include an alert field 946 with alert statuses 948 listed therein. Clicking on an alert status 948 may generate a popup menu 950 that allows a user to activate or suppress a particular alert. Still further, while not illustrated, the user may designate a particular tone or visual alert that should be used for a particular blackout event or an event within the blackout record.

The GUI 900 may further include a command bar 952 that has various command icons that allow the user to exercise various commands. The exemplary command icons shown are view, modify, cancel, execute, terminate, delete, suppress alert, print and sort. Other commands could be included as desired.

Note that while the discussion above uses particular time thresholds to change colors, an operator may designate the threshold to change states for a particular event. While not illustrated, the GUI 900 could also list transmission events that do not have associated blackout events.

Figure 10:
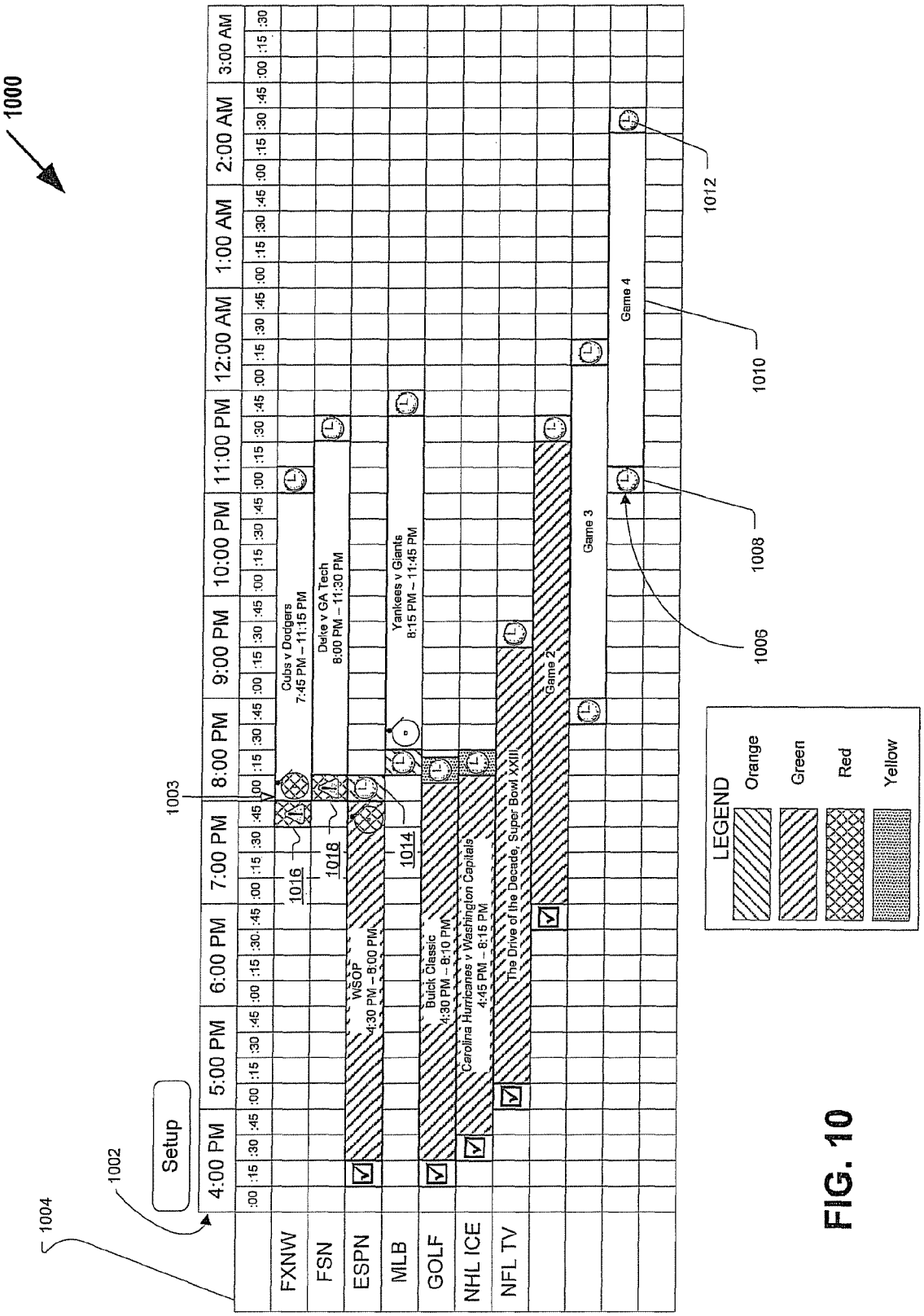
FIG. 10 is an illustration of a sixth particular embodiment of a user interface display to monitor and alarm video transmissions and blackouts.

Another GUI 1000 is illustrated in FIG. 10. The GUI 1000 is arranged as a channel/time grid, but conveys much of the same information in that blackout events may be color coded within the grid to provide a visual alert to a user as to a status of a particular blackout event. As illustrated, the GUI 1000 includes a time line 1002 on the x-axis of the grid. An arrow 1003 indicates the current time. Channels 1004 are listed on the y-axis of the grid. Blackout events appear as calendar style entries on the grid. A particular blackout event 1006 may include a start time status 1008, a shorthand summary of the blackout event 1010, and an end time status 1012.

Blackout events that started correctly are colored green, but the end time status 1014 is orange with an alert icon reflecting that the control system needs to determine whether the event ended properly. Likewise, the start time statuses 1016 and 1018 are red colored to reflect that there may be an error in how those blackout events started. While other arrangements of grids are contemplated, the discussed grid arrangement provides a neat, concise format for the presentation of information.

Figure 11:
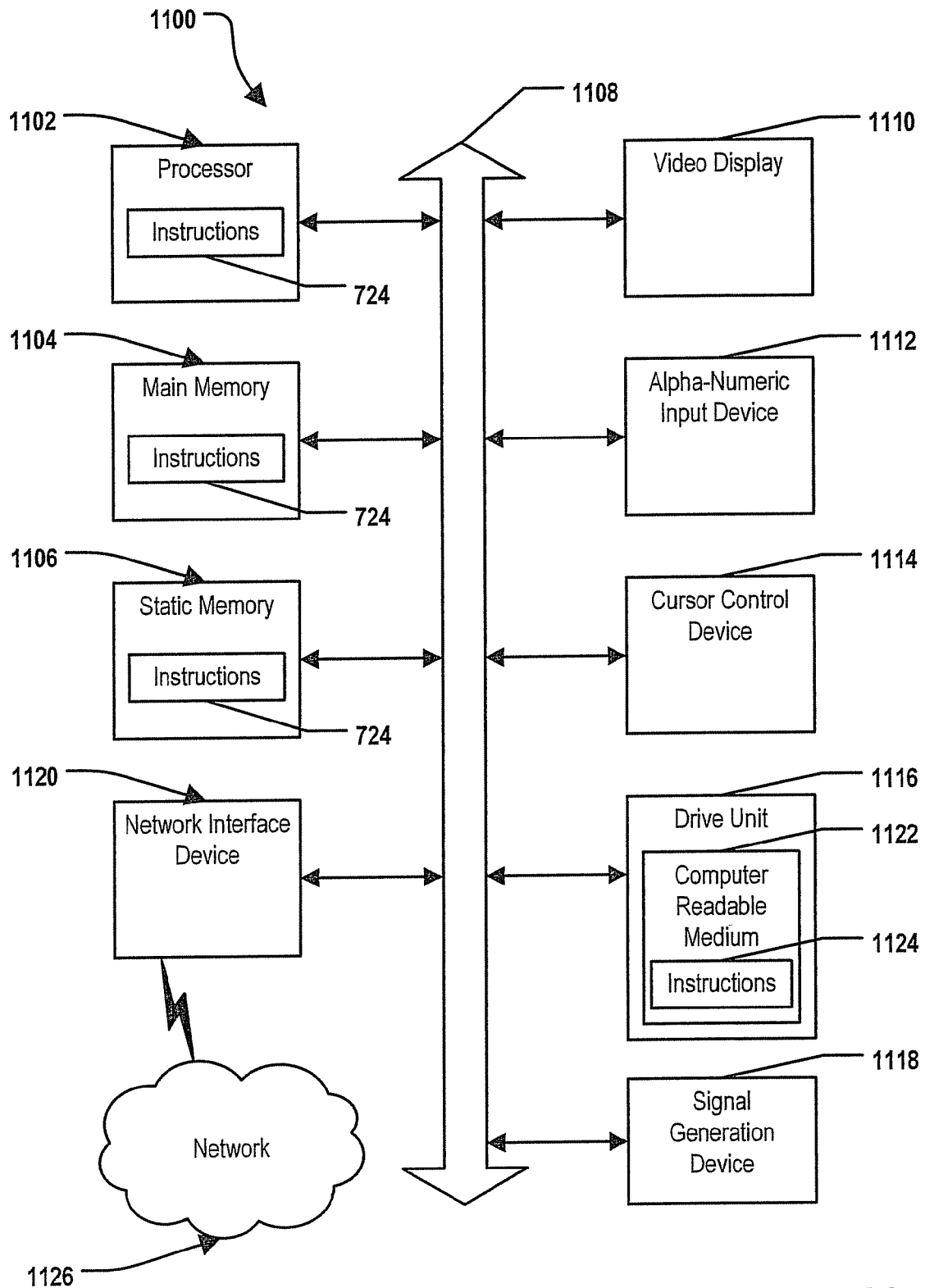
FIG. 11 is a block diagram of an illustrative embodiment of a computer system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices. For example, the computer system 1100 may include or be included in any one or more of the content provider devices, control interfaces, controllers, other video transmission system devices, or other device depicted in and described with reference to FIGS. 1 and 2.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106, that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving a selection relating to a first alarm and a first criterion in response to which the first alarm is to be generated for a first video transmission and an associated blackout event;
receiving a selection relating to a second alarm and a second criterion in response to which the second alarm is to be generated, wherein the second criterion is associated with information received from a set top box;
monitoring the first video transmission;
generating the first alarm when the first criterion is satisfied; and
generating the second alarm when the second criterion is satisfied;
wherein the second criterion is received in response to polling the set top box for a copy of a control message to determine if a blackout associated with the associated blackout event is successfully implemented.

2. The method of claim 1, further comprising generating a first linkage record that identifies a link between the first video transmission and a second video transmission, wherein the link indicates that an action relative to the second video transmission is to be executed when the first criterion is satisfied.

3. The method of claim 2, wherein the action relative to the second video transmission includes implementing a blackout of the second video transmission or lifting a blackout of the second video transmission.

4. The method of claim 1, wherein the second criterion is received in response to polling the set top box for a copy of a current control message to determine if a blackout associated with the associated blackout event is successfully lifted.

5. The method of claim 1, further comprising querying the set top box for a list of digital rights management keys.

6. The method of claim 1, wherein generating the first alarm comprises generating an audible alarm.

7. The method of claim 1, wherein generating the first alarm comprises generating a visual alarm.

8. The method of claim 1, wherein the first criterion comprises a time remaining until the associated blackout event is to begin.

9. The method of claim 1, wherein the first criterion comprises a time remaining until the associated blackout event is to end.

10. A non-transitory computer-readable storage medium comprising operational instructions that, when executed by a control system, cause the control system to:
receive a selection relating to a first alarm and a first criterion in response to which the first alarm is to be generated for a first video transmission and an associated blackout event;
receive a selection relating to a second alarm and a second criterion in response to which the second alarm is to be generated, wherein the second criterion is associated with information received from a set top box;
monitor the first video transmission;
generate the first alarm when the first criterion is satisfied; and
generate the second alarm when the second criterion is satisfied;
wherein the second criterion is received in response to polling the set top box for a copy of a control message to determine if a blackout associated with the associated blackout event is successfully implemented.

11. The non-transitory computer-readable storage medium of claim 10, further comprising operational instructions that, when executed by the control system, cause the control system to query the set top box for a list of digital rights management keys.

12. The non-transitory computer-readable storage medium of claim 10, wherein generating the first alarm comprises generating an audible alarm.

13. The non-transitory computer-readable storage medium of claim 10, wherein generating the first alarm comprises generating a visual alarm.

14. The non-transitory computer-readable storage medium of claim 10, wherein the first criterion comprises a time remaining until the associated blackout event is to begin.

15. The non-transitory computer-readable storage medium of claim 10, further comprising operational instructions that, when executed by the control system, cause the control system to generate a first linkage record that identifies a link between the first video transmission and a second video transmission, wherein the link indicates that an action relative to the second video transmission is to be executed when the first criterion is satisfied.

16. The non-transitory computer-readable storage medium of claim 15, wherein the action relative to the second video transmission includes implementing a blackout of the second video transmission or lifting a blackout of the second video transmission.

\* \* \* \* \*